(12) United States Patent
Schütt

(10) Patent No.: US 12,280,530 B2
(45) Date of Patent: Apr. 22, 2025

(54) MELT BLOWING NOZZLE APPARATUS

(71) Applicant: Oerlikon Textile GmbH & Co. KG, Remscheid (DE)

(72) Inventor: Günter Schütt, Neumünster (DE)

(73) Assignee: Oerlikon Textile GmbH & Co. KG, Remscheid (DE)

( * ) Notice: Subject to any disclaimer, the term of this patent is extended or adjusted under 35 U.S.C. 154(b) by 290 days.

(21) Appl. No.: 17/800,988

(22) PCT Filed: Feb. 5, 2021

(86) PCT No.: PCT/EP2021/052805
§ 371 (c)(1),
(2) Date: Aug. 19, 2022

(87) PCT Pub. No.: WO2021/165057
PCT Pub. Date: Aug. 26, 2021

(65) Prior Publication Data
US 2023/0082772 A1    Mar. 16, 2023

(30) Foreign Application Priority Data
Feb. 20, 2020    (DE) ............ 10 2020 001 132.2

(51) Int. Cl.
*B29C 48/05*    (2019.01)
*B29C 48/345*    (2019.01)
(Continued)

(52) U.S. Cl.
CPC ............ *B29C 48/05* (2019.02); *B29C 48/345* (2019.02); *D01D 1/106* (2013.01); *D01D 4/025* (2013.01); *D01D 4/06* (2013.01); *D01D 5/0985* (2013.01)

(58) Field of Classification Search
CPC .......... D04H 1/565; D01D 4/06; D01D 4/025; D01D 5/0985; D01D 1/106; B29C 48/05; B29C 48/345
See application file for complete search history.

(56) References Cited

U.S. PATENT DOCUMENTS

2002/0076460 A1    6/2002    Fare
2004/0265415 A1 *  12/2004   Baumeister ............ D01D 4/06
                                                   425/464
(Continued)

FOREIGN PATENT DOCUMENTS

| DE | 19735571 A1 * | 2/1999 | ............ D01D 1/06 |
| DE | 102005053248 A1 | 5/2007 | |
| DE | 102007032107 A1 * | 1/2008 | ............ D01D 4/06 |

OTHER PUBLICATIONS

Foreign Reference (Year: 1999).*
Foreign Reference (Year: 2008).*

*Primary Examiner* — Galen H Hauth
*Assistant Examiner* — Ariella Machness
(74) *Attorney, Agent, or Firm* — BainwoodHuang

(57) ABSTRACT

A melt blowing nozzle apparatus for producing a plurality of fiber strands from a polymer melt has at least one melt inlet and at least one process air inlet. The apparatus further has a nozzle plate having a plurality of small tubes, each having a capillary bore for extruding the fiber strands, and an extrusion plate arranged underneath the nozzle plate, which extrusion plate has a plurality of extrusion openings for blowing out the fiber strands, corresponding to the small tubes. Each extrusion opening encloses one of the small tubes with an air gap. To ensure mountability in case of a large number of small tubes, a channel system of a common distribution device is provided for connection and distribution of the melt inlet to the capillaries of the small tubes and (Continued)

Figure 1:
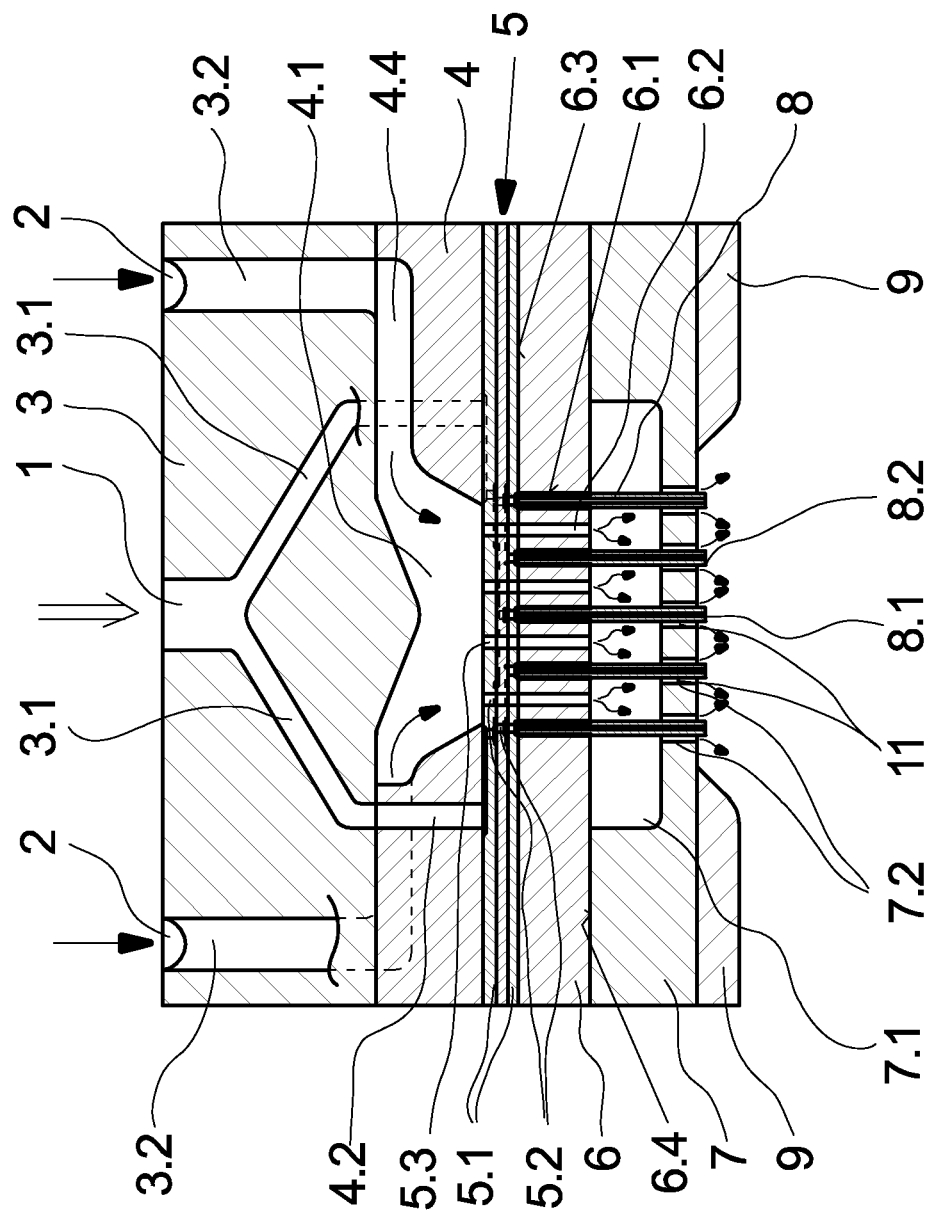

for connection and distribution of the process air inlet to the extrusion openings of the extrusion plate.

8 Claims, 4 Drawing Sheets

(51) Int. Cl.
*D01D 1/10* (2006.01)
*D01D 4/02* (2006.01)
*D01D 4/06* (2006.01)
*D01D 5/098* (2006.01)

(56) References Cited

U.S. PATENT DOCUMENTS

2009/0258562 A1* 10/2009 Brown .................. D01F 2/00
264/561
2015/0322592 A1   11/2015 Brown et al.

* cited by examiner

MELT BLOWING NOZZLE APPARATUS

The invention relates to a melt blowing nozzle apparatus for producing a multiplicity of fiber strands from a polymer melt, as disclosed herein.

A melt blowing nozzle apparatus of the generic type for producing a multiplicity of fiber strands is known from US 2015/0322592 A1.

In the known melt blowing nozzle apparatuses, an arrangement of a multiplicity of tubes in multiple rows is used for producing a multiplicity of fiber strands, each tube having one capillary bore. To this end, the tubes in an arrangement in multiple rows are held on a nozzle plate in such a manner that an upper end of the tubes configures an inlet on the upper side of the nozzle plate. The tubes protrude far outward from the opposite lower side of the nozzle plate, so as to enable the supply of process air below the nozzle plate and a distribution of the process air to the multiplicity of tubes. One extrusion opening for each tube is formed at the lower end of the tubes, said extrusion opening enclosing the respective tube by way of an air gap. In this way, the process air by way of the extrusion openings can exit in a manner coaxial with the tubes and generate the melt blowing stream on each of the tubes while extruding a polymer melt.

In order to enable in particular the air distribution of the process air to the multiplicity of tubes, an air distribution plate which has a multiplicity of air passages is disposed below the nozzle plate, so as to be spaced apart from the latter, such that the tubes and the air passages form a regular pattern. 10,000 tubes are thus held on one nozzle plate, for example.

However, a massive assembly problem arises in the known melt blowing nozzle apparatus because the air distribution plate with the, for example, 10,000 precisely fitted passages has to be plugged onto the free ends of the tubes. Therefore, the assembly is possible only with high complexity and only for a relatively limited number of tubes on the nozzle plate. Moreover, the tubes have a critical length in terms of the capillary bores, the latter requiring very high pressures during extrusion.

It is now an object of the invention to refine a melt blowing nozzle apparatus of the generic type in such a manner that working widths of >2 m and a nozzle plate having >10,000 tubes can be assembled and used under the customary operating conditions.

In terms of the melt blowing nozzle apparatus according to the invention, this object is achieved in that a duct system of a common distribution installation is provided for the connection and distribution of the melt inlet to the capillaries of the tubes, and for the connection and distribution of the process air inlet to the extrusion openings of the extrusion plate.

Advantageous refinements of the invention are defined by features and combinations of features as disclosed herein.

The invention has the particular advantage that the process air can be fed in a relatively centralized manner, a distribution of air below the nozzle plates no longer being required. The duct system of the distribution installation makes it possible for the polymer melt as well as the process air to be guided. In this way, the installation space below the nozzle plate can be minimized, this having a particularly favorable effect on the total length of the tubes.

In order for the multiplicity of tubes on the upper side of the nozzle plate to be uniformly supplied with a polymer melt in the process, the refinement of the invention in which the distribution installation has a plurality of distribution plates that lie on top of one another in a pressure-tight manner is preferably embodied, said distribution plates each having a multiplicity of passages and grooves for configuring the duct system. The distribution plates here are preferably formed from very thin metals, the surface grooves and passages thereof being produced by an etching method. This so-called layer technology makes possible a highly bifurcated distribution of melt, wherein the process air is guided separately from the polymer melt in the duct system.

In order for the process air to be able to be guided substantially in equivalent patterns as the tubes, the refinement of the invention in which the distribution installation bears in a pressure-tight manner on an upper side of the nozzle plate, and in which the nozzle plate has a multiplicity of air passage openings which for guiding the process air interact with the duct system of the distribution installation is preferably used. In this way, the tubes and the air passage openings can be configured as a uniform pattern on the nozzle plate.

As a result of a refinement of the invention as disclosed herein, the tubes can in particular be embodied so as to be relatively short. It is thus furthermore provided that the extrusion plate by way of an air distribution chamber penetrated by the tubes bears in a pressure-tight manner on a lower side of the nozzle plate, the air passage openings of the nozzle plate opening into said air distribution chamber. As a result of the tubes, which are kept relatively short, and the widened extrusion openings, the assembly of the extrusion plate can moreover be carried out without major difficulties even in the case of a large multiplicity of tubes.

In this way, the extrusion openings can be configured directly on a lower side of the extrusion plate so that the process air can enter the individual extrusion openings directly from the air distribution chamber.

The infeed of the process air above the distribution installation preferably takes place according to the refinement of the invention in which an infeed plate is disposed above the distribution installation, said infeed plate, so as to be centric, having a central air infeed chamber and, so as to be eccentric, having mutually opposite melt infeed ducts, wherein the air infeed chamber and the melt infeed ducts are connected to the duct system of the distribution installation. In this way, feeding of the process air as well as of the polymer melt into the duct system of the distribution installation can be carried out directly.

In terms of the infeed and the distribution of the process air, the refinement in which the infeed plate on a lower side has a plurality of air infeed bores which are connected to the air infeed chamber and by way of corresponding passages of the distribution plates of the distribution installation are connected to the air passages of the nozzle plate has proven particularly successful. In this way, the pattern arrangement of the air passage openings of the nozzle plate can already be implemented in a corresponding manner in the distribution plates and the infeed plate. Deflections of the process air during the distribution to the tubes can be avoided in this way.

In order to obtain a uniform process air infeed on both longitudinal sides across the entire working width, the refinement of the invention in which the infeed plate is assigned an inlet plate which centrally has the melt inlet and two process air inlets configured on either side of the melt inlet, wherein the melt inlet by way of melt inlet ducts is connected to the melt infeed ducts of the infeed plate, and the process air inlets by way of air inlet ducts are connected to the air infeed chamber of the infeed plate is preferably executed. It is customary here for a plurality of melt inlets and a plurality of process air inlets to be disposed on the inlet plate so as to be distributed across a longitudinal side.

In order to guarantee a uniform quality of the polymer melt when extruding the fibers, the refinement of the invention in which the inlet plate is divided into an upper plate and a lower plate, and in which the melt inlet in the upper plate is assigned a filter chamber having a filter element in the lower plate is additionally particularly advantageous, wherein the filter chamber is connected to the melt inlet ducts. In this way, the infed polymer melt can be continuously filtered.

The melt blowing nozzle apparatus according to the invention will be explained in more detail hereunder by means of a few exemplary embodiments with reference to the appended figures.

Figure 2:
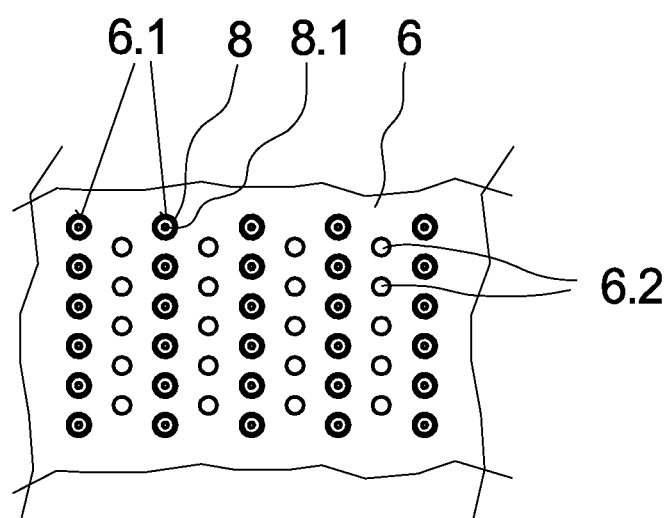
Figure 3:
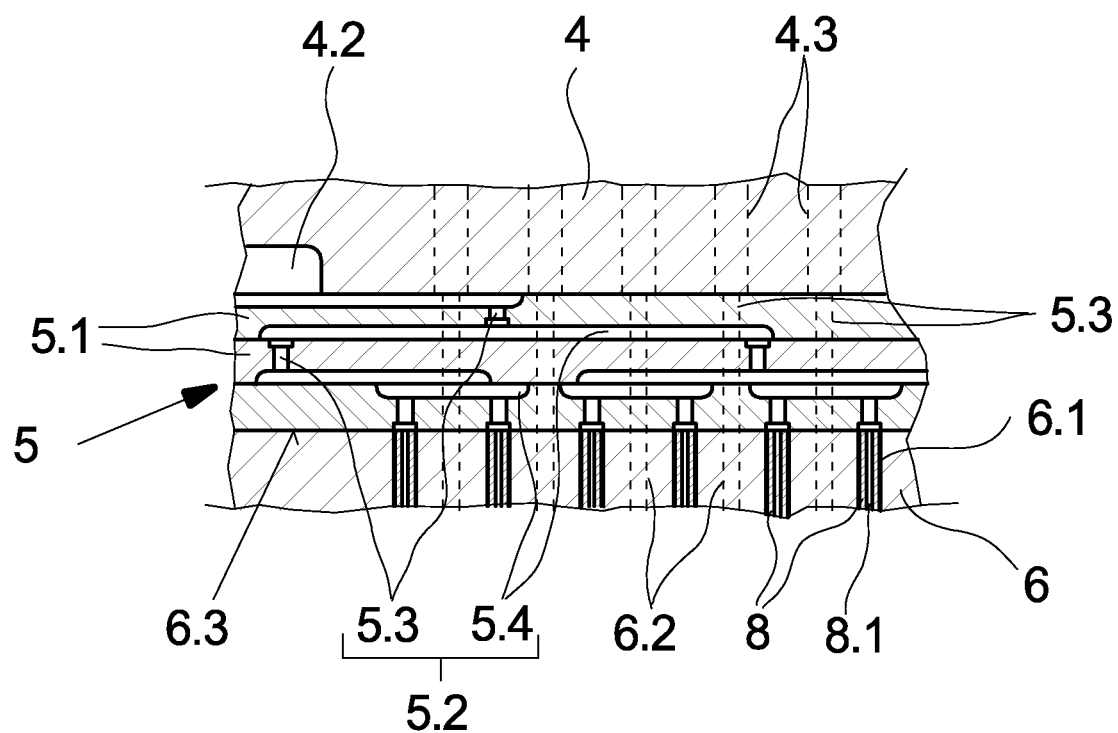
Figure 4:
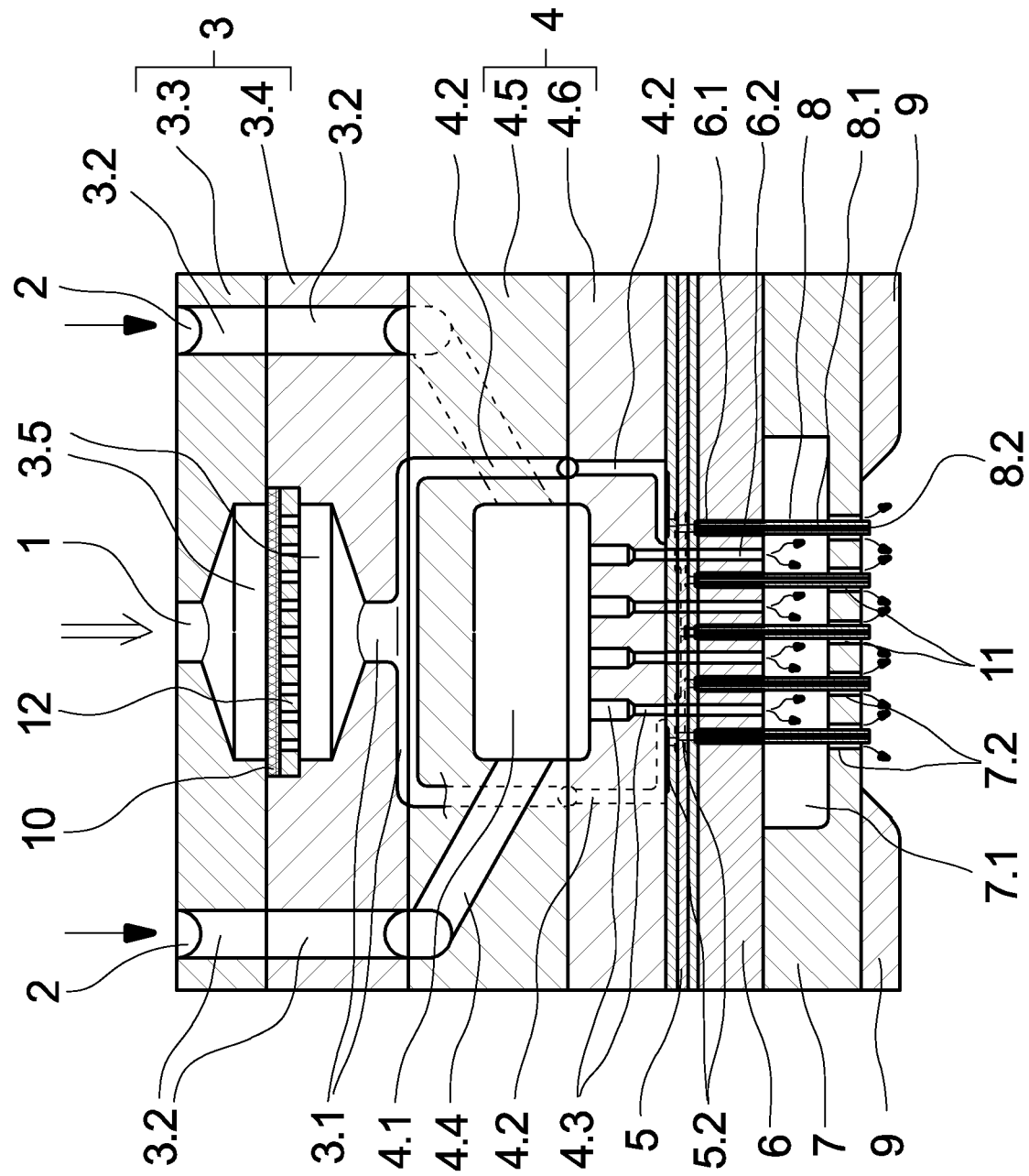

In the Figures:

FIG. 1 schematically shows a cross-sectional view of a first exemplary embodiment of the melt blowing nozzle apparatus according to the invention;

FIG. 2 schematically shows a fragment of a plan view of a nozzle plate of the exemplary embodiment from FIG. 1;

FIG. 3 schematically shows a cross-sectional view of a potential exemplary embodiment of a distribution installation; and FIG. 4 schematically shows a cross-sectional view of a further exemplary embodiment of the melt blowing apparatus according to the invention.

A cross-sectional view of a first exemplary embodiment of the melt blowing apparatus according to the invention is schematically illustrated in FIG. 1. The melt blowing apparatus has an inlet plate 3 on which are configured, so as to be centric, a melt inlet 1 and, on both sides of the melt inlet 1, in each case one process air inlet 2. The process air inlets 2 are assigned to the longitudinal sides of the inlet plate 3. The inlet plate 3 extends in the drawing plane and usually has a plurality of melt inlets 1 of this type. The melt inlet 1 opens into melt inlet ducts 3.1 which, conjointly with more air inlet ducts 3.2, penetrate the inlet plate 3.

An infeed plate 4 which is connected in a pressure-tight manner to the inlet plate 3 is disposed below the inlet plate 3. The infeed plate 4 in the central region has an air infeed chamber 4.1 into which one air infeed duct 4.4 opens on each of the two longitudinal sides. The air infeed ducts 4.4 of the infeed plate 4 are connected to the air inlet ducts 3.2 of the inlet plate 3. Melt infeed ducts 4.2 which penetrate the infeed plate 4 and are connected to the melt inlet ducts 3.1 of the inlet plate 3 are provided on both sides of the air infeed chamber 4.1. The air infeed chamber 4.1 and the melt infeed ducts 4.2 of the infeed plate 4 open into a duct system 5.2 of a distribution installation 5. The distribution installation 5 is disposed below the infeed plate 4 so as to be between the infeed plate 4 and a nozzle plate 6. The distribution installation 5 has a plurality of distribution plates 5.1, the surfaces of the latter having grooves and passages for configuring the duct system 5.2. Illustrated in this exemplary embodiment are a plurality of passages 5.3 which for guiding the process air are connected to the air infeed chamber 4.1 in the infeed plate 4.

The duct system 5.2 of the distribution installation 9 for guiding the polymer melt is only partially indicated and not shown in more detail here.

The distribution installation 5 is assigned the nozzle plate 6 which has a multiplicity of tube precision bores 6.1 and air passage openings 6.2. In each case, one tube 8 which on the upper side 6.3 of the nozzle plates 6 forms in each case one inlet of a capillary bore 8.1 is held in each of the tube precision bores 6.1. The open tubes 8 having capillary bores 8.1 are assigned to the duct system 5.2 of the distribution installation 5, so that a polymer melt can be fed to the capillary bore 8.1 in each tube 8. The air passage openings 6.2 are assigned to the passages 5.3 of the duct system 5.2 of the distribution installation 5.

The nozzle plate 6 on the lower side 6.4 is adjoined by an extrusion plate 7, below the air passage openings 6.2 and the tube precision bores 6.1 of the nozzle plate 6 has an air distribution chamber 7.1. The air distribution chamber 7.1 toward the lower side of the extrusion plate 7 is delimited by a multiplicity of extrusion openings 7.2. The extrusion openings 7.2 on the extrusion plate 7 are configured in a pattern arrangement identical to that of the tubes 8 in the nozzle plate 6. In this way, each of the extrusion openings 7.2 is penetrated by a tube 8. The free tube ends 8.2 of the tubes extend below the extrusion plate 7. An air gap 11 is formed in the extrusion opening 7.2, so as to be between the tube and the extrusion opening 7.2. The process air flowing out of the air distribution chamber 7.1, by way of the air gap 11, flows outward so as to be coaxial with the tubes 8 and leads to a melt blowing stream for extruding the fibers. A finisher plate 9 which extends on both longitudinal sides of the protruding tube ends 8.2 of the tubes 8 also adjoins the lower side of the extrusion plate 7.

In the exemplary embodiment illustrated in FIG. 1, five tubes 8 are illustrated next to one another so as to be transverse to a longitudinal direction only by way of example. As opposed thereto, a multiplicity of tubes 8 are held in the longitudinal direction, said multiplicity of tubes 8 extending across a working width of more than 2 m. It is thus customary for more than 10,000 tubes 8 to be held on one nozzle plate 6.

Shown by way of example in FIG. 2 is a lower side of the nozzle plate 6. The tube precision bores 6.1 and the air passage openings 6.2 are disposed in a regular pattern on the lower side 6.4 of the nozzle plate 6. This pattern extends across the entire working width, wherein a total of five tubes 8 are in each case disposed next to one another so as to be transverse to the longitudinal side.

The air passage openings 6.2 here are preferably used by passages in the distribution installation 5 in order to guide the process air. The polymer melt on the inlet side of the nozzle plate 6 is fed individually to the capillaries 8.1 of the tubes 8 by way of a system of grooves and passages.

A potential exemplary embodiment of a distribution installation 5 for distributing a polymer melt to plurality of tubes 8 in the nozzle plate 6 is illustrated in FIG. 3. The exemplary embodiment in FIG. 3 shows a fragment of a further exemplary embodiment of the melt blowing nozzle apparatus according to the invention. Shown here only partially in cross section are an infeed plate 4, a distribution installation 5 and a nozzle plate 6. The infeed plate 4 has a melt infeed duct 4.2 as well as a plurality of air infeed bores 4.3 illustrated with dashed lines.

The distribution installation 5 in this exemplary embodiment is illustrated by a total of three distribution plates 5.1. Each of the distribution plates 5.1 has a plurality of grooves 5.4 and passages 5.3 that form a duct system 5.2. In this way, the melt infeed duct 4.2 in the infeed plate 4 in this exemplary embodiment is connected to the capillaries 8.1 of the tubes 8 in the nozzle plate 6 by way of the duct system 5.2.

In contrast, the process air is guided by passages 5.3 (illustrated with dashed lines) in the distribution installation 5 and the air passage openings 6.2 in the nozzle plate 6 (likewise illustrated with dashed lines). The passages 5.3 of the distribution installation 5 here are assigned to a plurality of air infeed bores 4.3 of the infeed plate 4.

The exemplary embodiment of the distribution installation 5 illustrated in FIG. 3 is only by way of example. In principle, distribution installations of this type are formed by very thin foil-type plates which, when stacked on top of one another so as to form a plurality of plates, represent complex distribution structures. The surface grooves and passages are thus preferably generated by an etching method. It is essential here that the polymer melt and the process air are separately guided and distributed.

A further exemplary embodiment of the melt blowing nozzle apparatus according to the invention is schematically illustrated in a cross-sectional view in FIG. 4.

The exemplary embodiment illustrated in FIG. 4 has a two-part inlet plate 3 which contains an upper plate 3 and a lower plate 3.4. A melt inlet 1 is configured so as to be centric in the upper plate 3.3, and two process air inlets 2 are configured laterally next to the melt inlet 1. The melt inlet 1 is assigned a filter chamber 3.5 which is configured between the upper plate 3.3 and the lower plate 3.4. To this end, a filter element 10 as well as a support plate 12 are held in the lower plate 3.4. The filter chamber 3.5 is assigned a melt inlet duct 3.1 which opens into the joint between the lower plate 3.4 and an infeed plate 4. The process air inlets 2 open into air inlet ducts 3.2 which completely penetrate the inlet plate 3.

The infeed plate 4 disposed below the inlet plate 3 is likewise configured in two parts, and has an upper infeed plate 4.5 and a lower infeed plate 4.6. The upper infeed plate 4.5 centrally contains an air infeed chamber 4.1 which by way of air infeed ducts 4.4 is connected to the air inlet ducts 3.2 of the inlet plate 3. A plurality of melt infeed ducts 4.2, which are connected to the melt inlet duct 3.1 of the inlet plate 3 and penetrate the upper infeed plate 4.5 and the lower infeed plate 4.6 up to the joint toward a distribution installation 5, extend on both sides of the air infeed chamber 4.1. The lower infeed plate 4.6 in this exemplary embodiment has a plurality of air infeed bores 4.3 which on the lower side of the lower infeed plate 4.6 open into a duct system 5.2 of the distribution installation 5.

The distribution installation 5 in this exemplary embodiment likewise has a duct system 5.2 which is configured in a plate stack of a plurality of distribution plates 5.1 and carries out a distribution of the polymer melt and the process air.

A nozzle plate 6 as well as an extrusion plate 7 adjoin the lower side of the distribution installation 5. The construction of the nozzle plate 6 and of the extrusion plate 7 is identical to that of the aforementioned exemplary example such that, for the avoidance of repetitions, at this point reference is made to the aforementioned description and no further explanation is offered.

A finisher plate 9 which is likewise configured in two parts and on the longitudinal sides extends to the tube ends 8.2 of the tubes 8 adjoins the lower side of the extrusion plate 7.

The exemplary embodiment of the melt blowing nozzle apparatus illustrated in FIG. 4 in terms of the function thereof is substantially identical to the exemplary embodiment as per FIG. 1 and differs therefrom only in terms of the filtration of the infed polymer melt by the filter element 10 within the inlet plate 3. To this extent, reference is made to the aforementioned description.

In the case of the exemplary embodiments of the melt blowing nozzle apparatuses illustrated in FIGS. 1 and 4 it is also to be mentioned that the polymer melt and also the process air can be fed across a working width by way of a plurality of melt inlets 1 and a plurality of process air inlets 2. In this way, the melt inlet ducts 3.1 in the inlet plate 3, or else the air inlet ducts 3.2 in the inlet plate 3, are connected to corresponding melt inlet ducts 3.1 and air inlet ducts 3.2 by grooves.

The invention claimed is:

1. A melt blowing nozzle apparatus for producing a multiplicity of fiber strands from a polymer melt, having at least one melt inlet, having at least one process air inlet, having a nozzle plate which has a multiplicity of tubes each having a capillary bore for extruding the fiber strands, and having an extrusion plate which is disposed below the nozzle plate and, in a manner corresponding to that of the tubes, has a multiplicity of extrusion openings which for blowing the fiber strands each enclose one of the tubes by way of an air gap, wherein a duct system of a common distribution installation is provided for the connection and distribution of the melt inlet to the capillaries of the tubes, and for the connection and distribution of the process air inlet to the extrusion openings of the extrusion plate, wherein an infeed plate is disposed above the distribution installation, said infeed plate has centrically a central air infeed chamber and eccentrically mutually opposite melt in-feed ducts, wherein the air infeed chamber and the melt infeed ducts are connected to the duct system of the distribution installation.

2. The melt blowing nozzle apparatus as claimed in claim 1, wherein the distribution installation has a plurality of distribution plates that lie on top of one another in a pressure-tight manner, wherein each of the distribution plates has a multiplicity of passages and grooves for configuring the duct system.

3. The melt blowing nozzle apparatus as claimed in claim 2, wherein the distribution installation bears in a pressure-tight manner on an upper side of the nozzle plate, and in that the nozzle plate has a multiplicity of air passage openings which for guiding the process air interact with the duct system of the distribution installation.

4. The melt blowing nozzle apparatus as claimed in claim 3, wherein the extrusion plate by way of an air distribution chamber penetrated by the tubes bears in a pressure-tight manner on a lower side of the nozzle plate, the air passage openings of the nozzle plate opening into said air distribution chamber.

5. The melt blowing nozzle apparatus as claimed in claim 4, wherein the extrusion openings and the air distribution chamber are connected to one another in the extrusion plate.

6. The melt blowing nozzle apparatus as claimed in claim 5, wherein the infeed plate on a lower side has a plurality of air infeed bores which are connected to the air infeed chamber and by way of corresponding passages of the distribution plates of the distribution installation are connected to the air passage openings of the nozzle plate.

7. The melt blowing nozzle apparatus as claimed in claim 5, wherein the infeed plate is assigned an inlet plate which centrally has the melt inlet and two process air inlets configured on either side of the melt inlet, wherein the melt inlet by way of melt inlet ducts is connected to the melt infeed ducts of the infeed plate, and the process air inlets by way of air inlet ducts are connected to the air infeed chamber of the infeed plate.

8. The melt blowing nozzle apparatus as claimed in claim 7, wherein the inlet plate is divided into an upper plate and a lower plate, and in that the melt inlet in the upper plate is assigned a filter chamber having a filter element in the lower plate, wherein the filter chamber is connected to the melt inlet ducts.

* * * * *